(12) United States Patent
Bentrim et al.

(10) Patent No.: US 6,517,300 B2
(45) Date of Patent: Feb. 11, 2003

(54) RECTANGULAR HOLE SNAP-IN FASTENER

(75) Inventors: Brian G. Bentrim, Hatfield, PA (US); William P. McDonough, Collegeville, PA (US); David J. Bruno, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 44 days.

(21) Appl. No.: 09/734,943

(22) Filed: Dec. 13, 2000

(65) Prior Publication Data

US 2001/0031190 A1 Oct. 18, 2001

Related U.S. Application Data

(60) Provisional application No. 60/183,974, filed on Feb. 22, 2000.

(51) Int. Cl.$^7$ ................................................. F16B 13/06
(52) U.S. Cl. ............................ 411/45; 411/41; 24/453
(58) Field of Search .................... 411/41, 45–48, 411/508, 913, 107, 180; 24/297, 453

(56) References Cited

U.S. PATENT DOCUMENTS

| | | | |
|---|---|---|---|
| 3,551,963 A | | 1/1971 | Mosher, Jr. et al. |
| 4,276,806 A | * | 7/1981 | Morel |
| 4,559,679 A | | 12/1985 | Downey |
| 4,715,095 A | | 12/1987 | Takahashi |
| 5,135,341 A | | 8/1992 | Leyder |
| 5,261,772 A | * | 11/1993 | Henninger |
| 5,560,575 A | * | 10/1996 | Krysiak |
| 5,567,098 A | * | 10/1996 | Gordon |
| 5,674,094 A | | 10/1997 | Hutchinson, Jr. et al. |
| 6,079,923 A | * | 6/2000 | Poss |
| 6,176,660 B1 | * | 1/2001 | Lewis |

FOREIGN PATENT DOCUMENTS

EP          0814273          12/1997

* cited by examiner

*Primary Examiner*—Flemming Saether
(74) *Attorney, Agent, or Firm*—Gregory J. Gore

(57) ABSTRACT

A snap-in fastener secures two sheets together by snap fit. Extensions of the fastener body include a clinch feature that provides a permanent attachment to a first sheet of metal. Integral snap arms which extend beyond the opposite side of the first sheet provide a reusable means to attach to an appropriately sized hole in a second sheet thus uniting the two sheets. The sheets include rectangularly-shaped holes positioned in alignment through which the snap arms of the fastener pass to achieve attachment. A locking mechanism may be employed to hold the snap arms in their engaged position to prevent pull-out of the second panel. In addition, finger grips integral with the body of the fastener provide an ergonomically suitable handle for carrying the attached sheet.

14 Claims, 8 Drawing Sheets

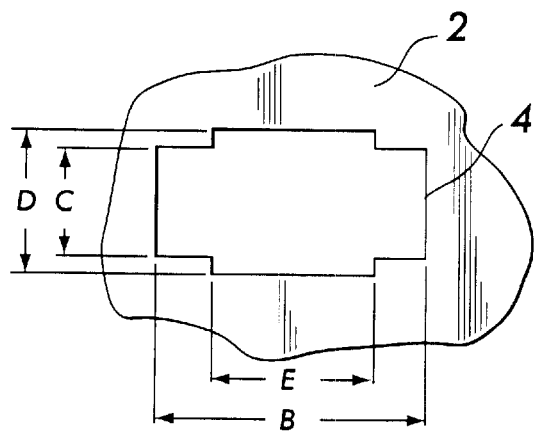
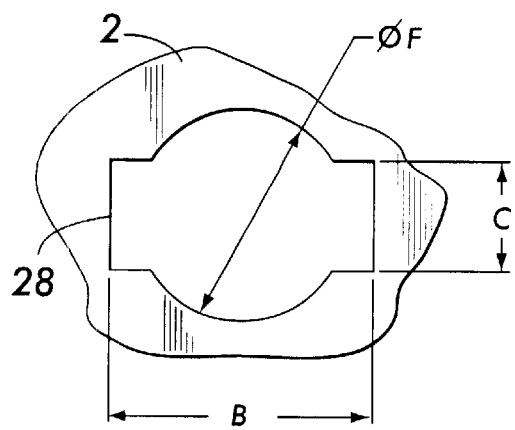
FIG.9  FIG.10
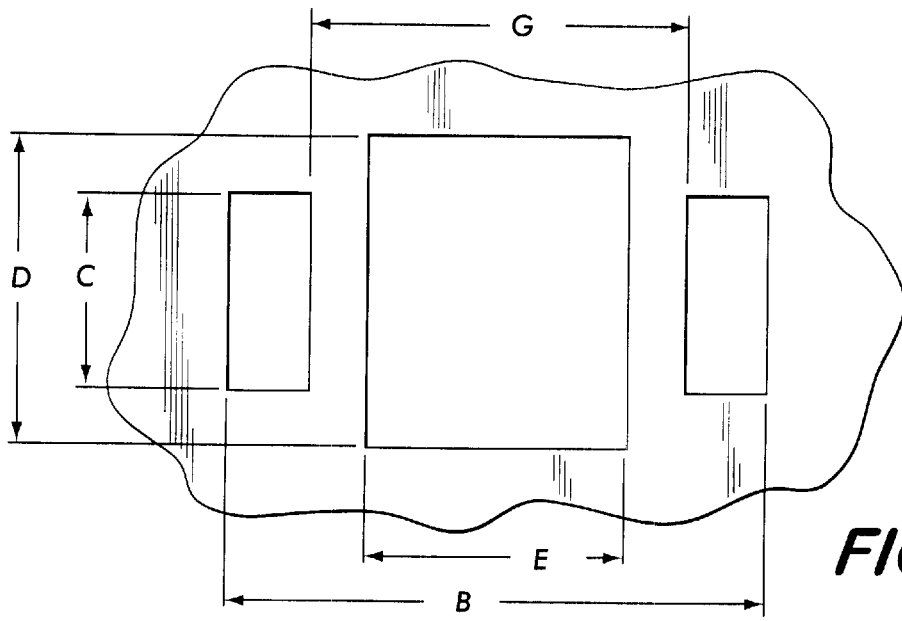
FIG.11
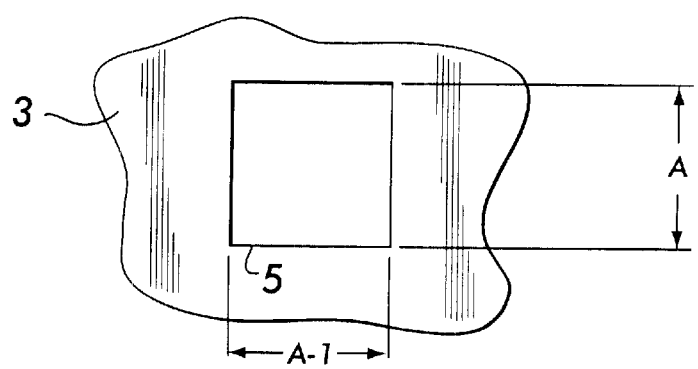
FIG.12

RECTANGULAR HOLE SNAP-IN FASTENER

The present application is related to provisional patent application entitled "Rectangular-Hole Snap-In Fastener", Ser. No. 60/183,974, filed Feb. 22, 2000, priority from which is hereby claimed.

FIELD OF THE INVENTION

This invention relates to snap engagement fastening for quickly installed fasteners to secure two panels or sheets. In particular, it relates to panel fasteners which permit the manual securement and release of two panels or sheets.

BACKGROUND OF THE INVENTION AND PRIOR ART

The process of assembling equipment into racks involves attaching the equipment shelf to the side rails of a rack that has a series of vertically spaced rectangular holes in the side rails. Prior art fasteners for this type of rack system utilize a cage nut assembly, washer, and screw combination. This process requires that a cage nut be installed in the rack in the correct vertical position which requires a good deal of manual dexterity, and a special tool. Next, the shelf is placed so that the holes are aligned with the cage nut, and then manually held in place while a screw and washer are put into place and tightened. This operation needs to be repeated on both sides of the rack and two to four fastener assemblies may be required for each shelf. Removal of the shelf requires that all screws be removed and such loose screws and washers are then prone to be lost or fall into the sensitive electronic equipment. If retained threaded fasteners are used, each of them will require multiple turns by hand or with a tool for installation and removal. Thus, the present method of assembling rack systems is both time consuming and cumbersome. There is therefore a need to simplify the process of assembling equipment shelves to a rack having vertically spaced square holes.

SUMMARY OF THE INVENTION

The present invention significantly simplifies affixing an equipment shelf to the sides of the equipment rack. A novel snap-in fastener for rectangular holes has been developed which is permanently affixed to the shelf Attachment of the shelf is accomplished by merely snapping a the fastener into the rectangular holes in the side rails of the rack. Removal is accomplished by simply pulling on the shelf or the fastener itself There is no loose hardware that can be lost or cause damage to the equipment. While the present invention is an advancement in the art of assembling rack systems, the fastener disclosed herein is not limited to this specific application. It may be used in any application where panels need to be quickly secured without tools. This invention provides a fastener with several important features. First, the fastener has a clinch feature that provides permanent attachment to a first sheet of metal. Secondly, integral snap-arms provide a reusable means to attach the first sheet to an appropriately-sized rectangular hole in a second sheet. In addition, other optional features such as a locking mechanism and finger grips may be included.

The clinch attachment works by displacing metal from the first sheet into the undercut of the fastener. Once the metal has entered the undercut the part is permanently attached to the first sheet. The clinch profile and the overall envelope of the fastener can be sized for a wide variation of panel sizes and thickness.

The snap-arms include tapered barbs that allow the ends of the arms to initially engage the rectangular hole on the second sheet. With continued axial application of force, the arms flex inward and pass through the hole, at which point the arms return to their original position and thus retain the fastener in the hole. Pulling on the fastener or the shelf releases it in a similar manner.

A further embodiment of the fastener includes a locking mechanism. Once the second sheet has been engaged, a lock clip is pushed forward and snaps into place between the snap-arms thus preventing the fastener from loosening or being removed. This is accomplished by the lock clip acting as a positive stop to prevent the snap-arms from flexing inward and disengaging the hole in the second sheet. The fastener is then unlocked by simply pulling the lock clip into the unlocked position. In the unlocked position, the locking mechanism is out of the path of the flexing arm and allowing separation of the two sheets. The lock clip may include detents to ensure that the lock is held out of the path of the snap-arms while it is unlocked. The lock clip also prevents premature disengagement due to vibration. The lock clip may be molded from plastic, thereby providing a means of color identification and matching.

Another embodiment includes finger grips integral with the fastener. This allows parts of the fastener to function as a handle for the equipment. The extension of the fastener body is ergonomically designed and eliminates the need for additional hardware such as handles and/or knobs. Also by locating the finger grips directly behind the snap feature, the applied forces are directed axially, reducing lateral stresses on the fastener, thereby reducing the required force of assembly and disassembly.

BRIEF DESCRIPTION OF THE DRAWINGS

FIGS. 9–12 show various alternate sheet aperture configurations;

DESCRIPTION OF THE PREFERRED EMBODIMENT

Figure 1:
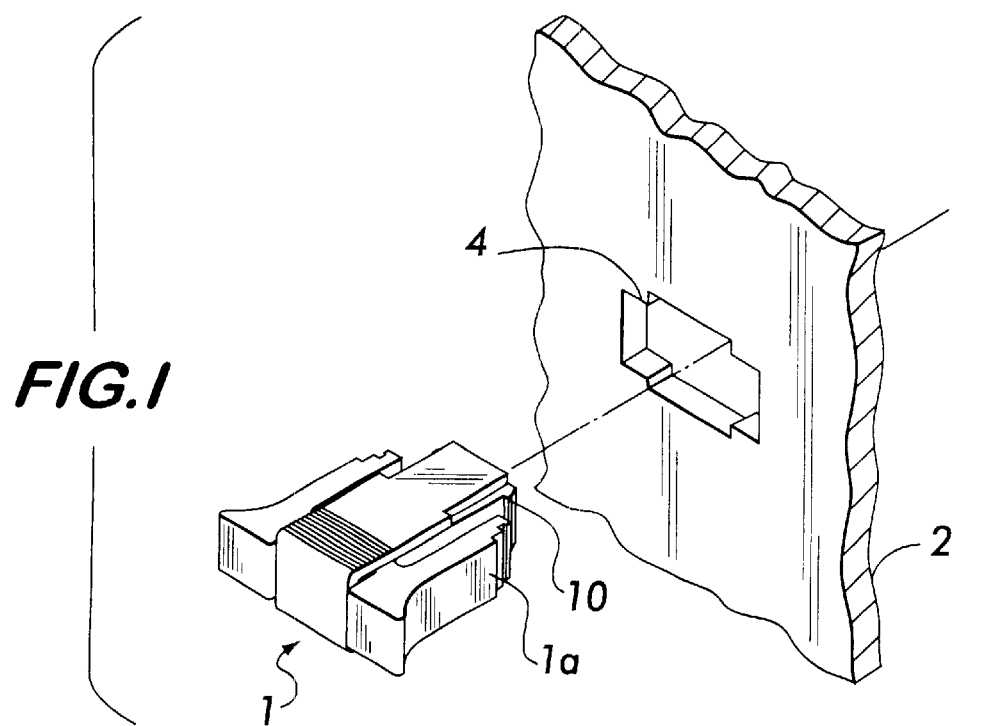
FIGS. 1 and 1A are top right front isometric assembly views of the present invention.
Figure 1A:
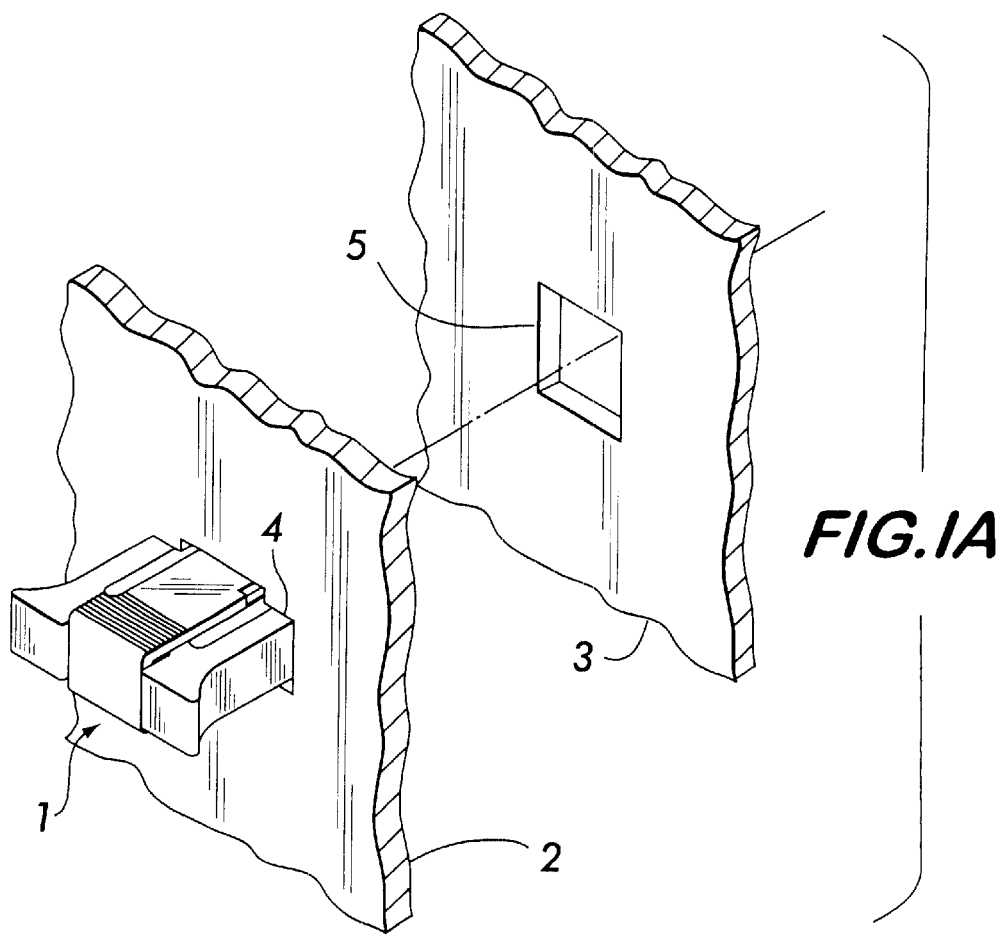
Figure 2:
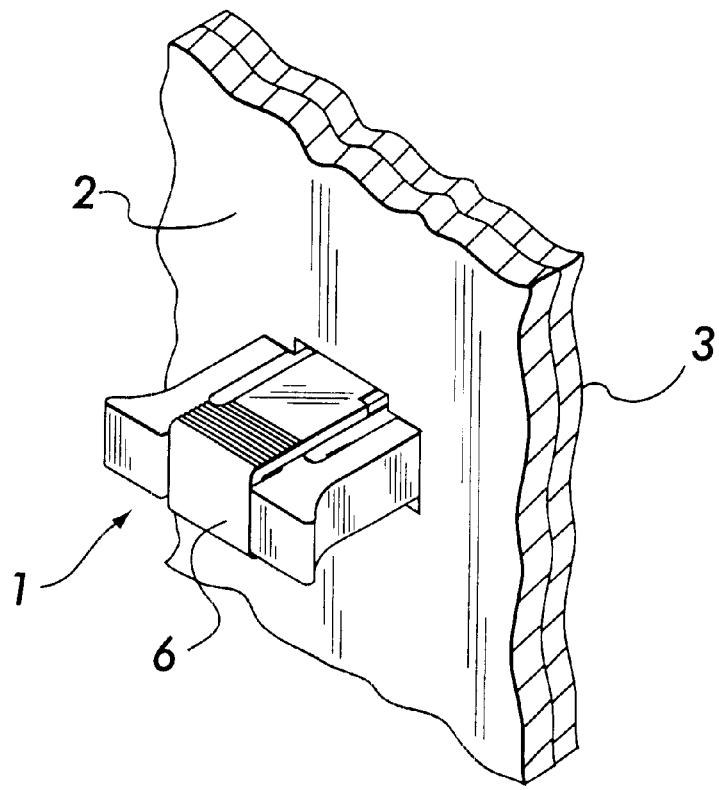
FIG. 2 is top right front perspective view of the present invention securing parallel sheets.
Figure 3:
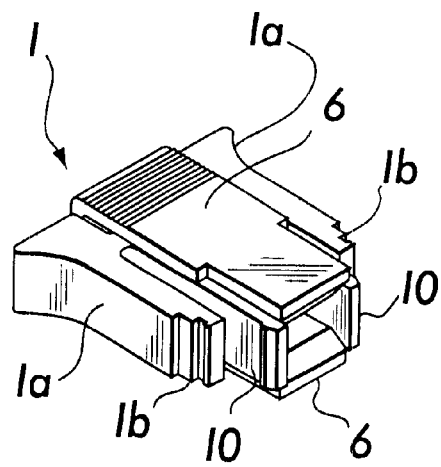
FIG. 3 is a top right rear isometric view of the present invention.

FIGS. 1, 1A, 2, and 3 depict the basic features of the fastener of the present invention in perspective view. FIG. 1 shows the fastener 1 with its longitudinally extending side extensions 1a and snap-arms 1b aligned with properly sized mounting hole 4 in first sheet 2 prior to installation. In FIG. 1A, the fastener is permanently clinched to first sheet 2 and in position, aligned with hole 5, for attachment to second sheet 3. FIG. 2 shows the three elements in FIGS. 1 and 1A joined. The second sheet 3 is releasably attached by the fastener to the first sheet by means of resilient snap-arms 10 of the fastener which lie between the side extensions on either side of the longitudinal axis of the fastener. The snap-arms have barbed ends which grip the side edges of hole 5 in the second sheet 3. Lock clip 6 is shown in its locked position with legs which extend between the snap-arms to positively wedge them apart. FIG. 3 is a perspective view from the attachment end of the fastener and more clearly shows the basic elements of a fastener including side extension 1a, lock clip 6, snap-arms 10 and the clinch feature 1b. Lock clip 6 is shown in the locked position.

Figure 4:
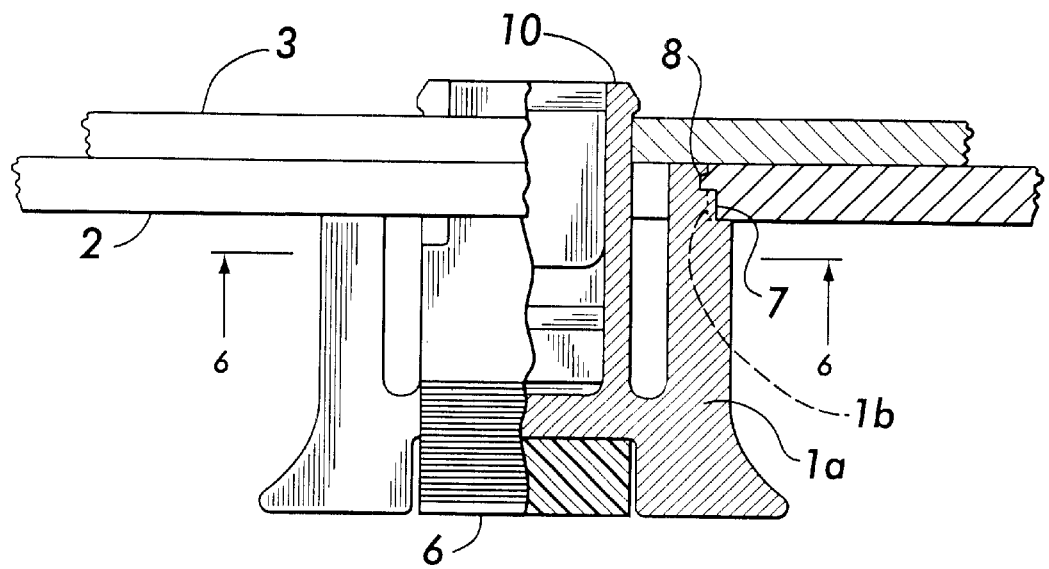
FIGS. 4 and 5 are top views partially sectioned showing the lock clip in different positions.
Figure 5:
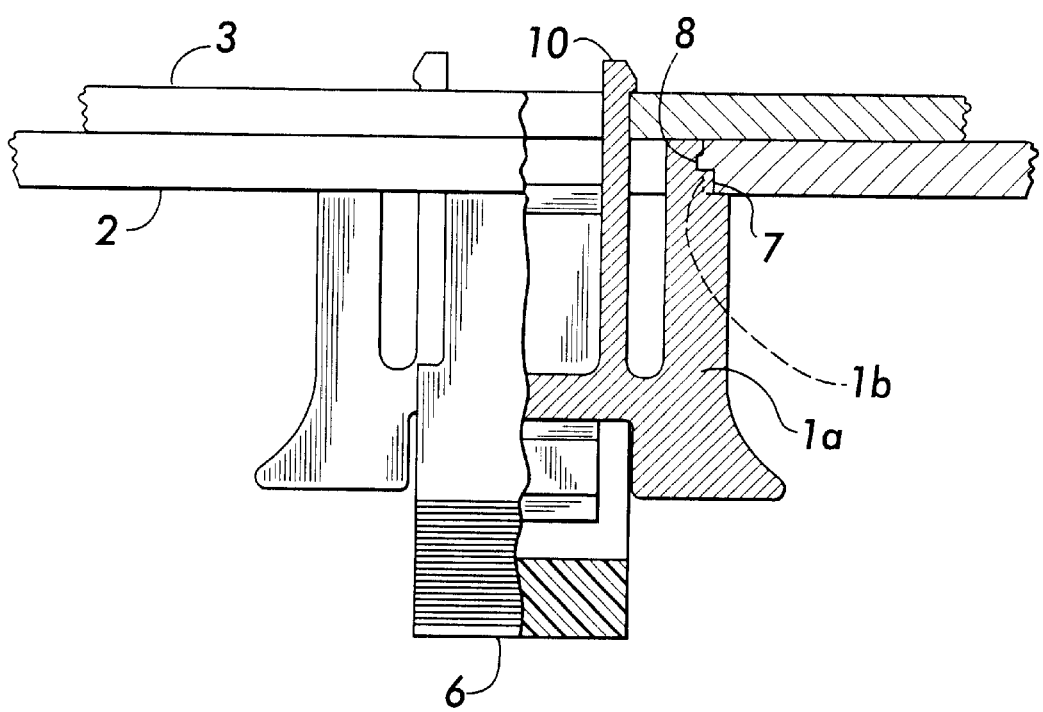

FIGS. 4 and 5 are cross-sectional views of the assembled sheets shown in FIG. 2, with FIG. 4 showing the fastener with lock clip 6 in its locked position and FIG. 5 showing the fastener with the lock clip in the unlocked position. Referring first to FIG. 4, the sides of the main body of the fastener are shown in detail clinched into first sheet 2. Displacer 7 forces the material of sheet 2 into undercut 8 as it is pressed into the sheet. Snap-arms 10 extend through the backside of second sheet 3 which is attached by direct contact with barbs at the ends of the snap-arms. In this Figure, the lock clip is in its locked position whereby the clip legs are moved between the ends of the snap-arms to hold them wedged apart. It will be understood that the dimensions of the fastener and the relationship between the barbs and the clinch features on the main body of the fastener to the thickness of the attached panels are critical to the snap attachment.

Referring now to FIG. 5, the same elements in FIG. 4 are shown except that lock clip 6 is in its retracted and unlocked position. In this position, the legs of the lock clip are withdrawn from the ends of the snap-arms and therefore the barbs are not blocked from flexing inward as the fastener is pulled out of second sheet 3. The snap-arms and configuration of the snap attachment barbs are designed to provide the desired amount of insertion and pull-out force.

Figures 6, 8:
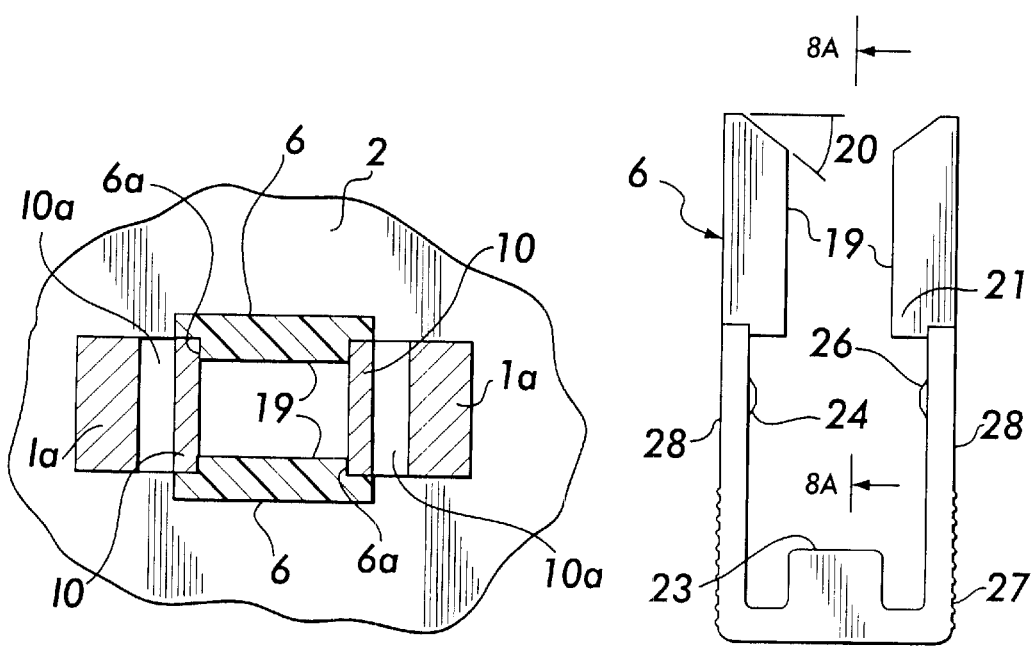
FIG. 6 is a front sectional view taken from FIG. 4 as shown in that Figure.
FIG. 8 is a side view of the lock clip element of the present invention.

Referring now to FIG. 6, a cross-section taken from FIG. 4 as shown in that Figure, depicts greater detail of the snap-arms 10 and the lock clip 6. From this view, lock clip 6 can clearly be seen boxing-in snap-arms 10 which abut shoulders 6a on the inside surface of the lock clip arms and are constrained by the side surfaces of inward facing tabs 19. Without inward deflection, the barbs at the ends of the snap-arms will not release the second sheet and thus engagement of the clip lock provides positive attachment of the second sheet to the fastener.

When in their locked position, the side edges of the snap-arms correspond in dimension to the dimension of the apertures in the sheets so that the sheets are retained laterally, axially, and against rotation. Hence, the sheets are positively secured, being held against movement in all directions. The side extensions 1a of the main body of the fastener 1 are spaced from the lock arms by a gap 10a to permit the snap-arms 10 to flex.

Figures 7, 8A:
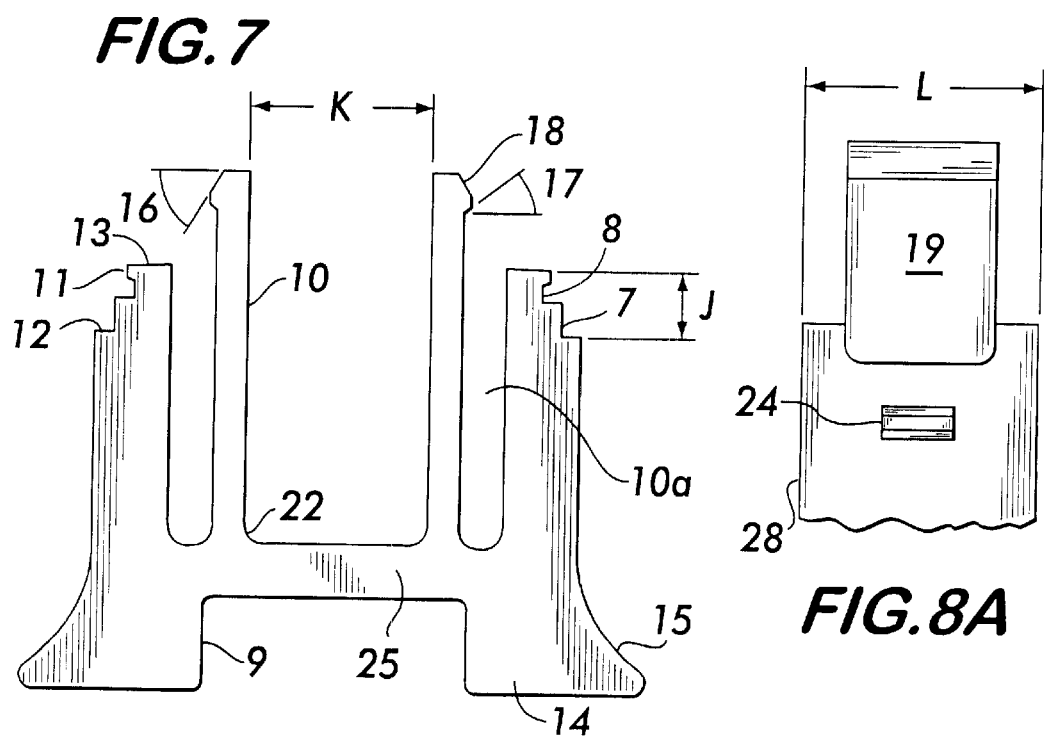
FIG. 7 is a top view of the main body element of the present invention.
FIG. 8A is a sectional view taken from FIG. 8.

Referring now to FIG. 7, the main body of the fastener is shown. Snap-arms 10 are separated by a gap K and are sized to ensure that the deflection required for snapping is within the elastic region of the material. Surface 13 is the resting surface for the second sheet that provides a positive stop for the snap-in motion when the clinched sheet 2 is thinner than the height J of the clinch feature. When the clinched sheet 2 is thicker than the height of the clinch feature, the clinched sheet acts as the positive stop for the snap-in motion, both sheets being held in face-to-face contact. A lead-in taper 16 on the barbs 18 of the arms 10 forces the arms to flex inward as they are pushed against the sides of hole 5 in the second sheet. Once fully within hole 5 of the second sheet, the arms 10 containing the barbs 18 return to their normal unflexed position on the back of the second sheet 3 to retain the first sheet and fastener assembly axially in sheet 2. The back taper 17 of the barbs allow the fastener to be removed from the hole in a manner similar to the function of taper 16. Angles 16 and 17 control the amount of force that is required to install and remove the fastener. Typically angle 16 is 60 degrees and angle 17 is 45 degrees so that the installation force is lower than the removal force. In this Figure, the clinch displacer 7 and undercut 8 are again clearly seen. Guide 11 provides a clearance fit to the first sheet mounting hole and acts as a lead to aid in aligning the fastener with sheet 2 during installation. Surface 12 is a positive stop for the installation clinch process into the first sheet. Finger grip 14 is large enough to be gripped easily and the outwardly curved radius 15 is ergonomically designed.

The view direction of FIG. 8 is rotated 90 degrees relative to FIG. 7 and shows the side view of the lock clip 6 with legs 28 having inward facing tabs 19 at their ends. As shown in FIG. 6, these tabs fit between the snap-arms 10 of the fastener and are oriented 90 degrees to the snap-arms to hold them positively wedged apart, resisting inward deflection. With the lock clip tabs 19 in the locked position against the snap-arms, the snap-arms box in the inside surfaces of the rectangular hole of the second sheet to secure the two sheets against relative motion The lock clip tabs 19 have a leading taper 20 that allows the lock to snap into place over the body of the fastener when the two pieces are initially assembled. Radii 21 along the bottom corners of each tab 19 are compatible with the relief radii 22 (FIG. 7) on the snap-arms to provide a close fit in the unlocked position. Lock recess 9 of FIG. 7 is sized to closely receive the base of the lock clip so that its outer surface is flush with the finger grips of the fastener when in the locked position as shown in FIGS. 1, 2, and 3. The lock recess 9 has parallel interior side larger than the space between the snap-arms 10 to give the lock additional stability in both the locked and unlocked positions. Surface 23 seats against the recess 9 of the fastener main body shown in FIG. 7 to provide a positive stop for the lock clip in the locked position. Detent 24 positions and holds the lock clip in the locked and unlocked positions. The outside surface of the snap-arms includes ergonomic series of raised ridges 27 so that the lock can be easily pushed and pulled. The engagement and disengagement requires only enough force to move the detents 24 and 26 past the body 25 shown in FIG. 7.

FIG. 8A is a side view of FIG. 8. In FIG. 8A, the portion of the lock clip, L that remains outside of sheet 2 is wider than the dimension, K of the snap-arms shown in FIG. 7, to prevent rotation of the lock clip about 25. Inward facing tab 19 extends from the end of leg 28 which also includes detent 24 that functions as explained above. The structure of tab 19 can be seen with greater clarity with reference to the embodiment shown in FIG. 21 which depicts the same tab structure but includes catch means.

FIGS. 9–12 show various sheet aperture configurations, FIGS. 9, 10 and 11 show alternate configurations of the apertures in the first sheet 2. FIG. 12 shows the basic configuration of the rectangular hole of the second releasably attached sheet 3. FIG. 9 shows the first of the two most simple variations of holes with which the clinch will work. Length "B" of the hole 4 must be carefully dimensioned to work with the clinch feature. The width "C" must be sized closely with the thickness of the fastener to reduce the possibility of misalignment during installation. In the preferred variation with the lock feature, an extension is required in the hole 4 to accommodate the lock. This is shown by dimensions "D" and "E".

FIG. 10 is an alternate mounting hole suitable for clinch attachment and lock clearance. The diameter "F" corresponds with a circle circumscribed about the rectangle defined by dimensions "D" and "E".

FIG. 11 shows a first sheet aperture which provides the greatest amount of sheet material around the opening for added sheet strength. This configuration has three rectangular holes. The central hole provides the relief for the lock arms and room for the snap-arms to flex. The two side holes are sized to provide a proper clinch attachment. Dimension "G" should be sized to accommodate side extensions 1b that contains the clinch features 1b. FIG. 12, shows the rectangle hole 5 of the second sheet 3 that receives the barbs of the snap-arms. The dimension "A" must be sized with respect to the width of the snap-arms and the barbs. Dimension A1 of the rectangular hole 5, must simply be greater than the thickness of the snap-arms. Dimension A1 may be greater than the minimum to allow for lateral misalignment when multiple fasteners are used in the same sheet.

Figure 13:
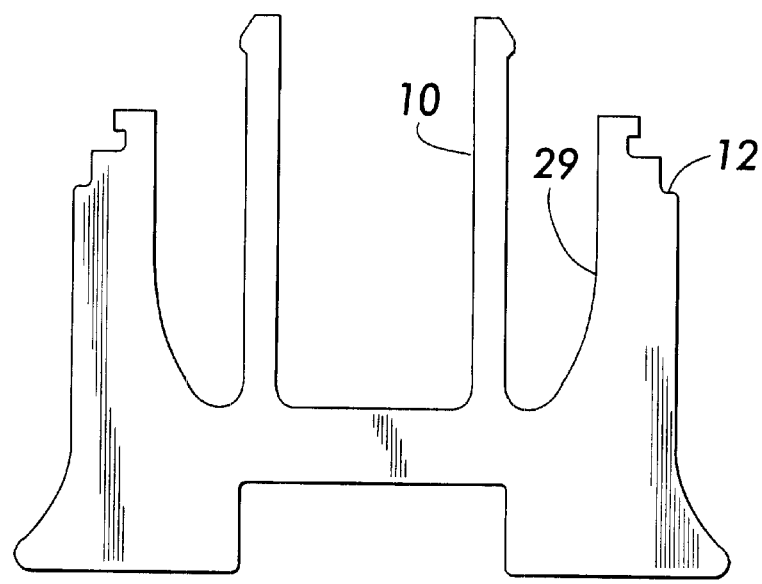
FIG. 13 is a top view of an alternate embodiment of the main body portion.

FIG. 13 shows an alternate embodiment of the fastener having a curved wall 29 for greater strength. This curve allows the fastener to withstand additional force during the installation of the clinch.

Figures 14, 15, 16:
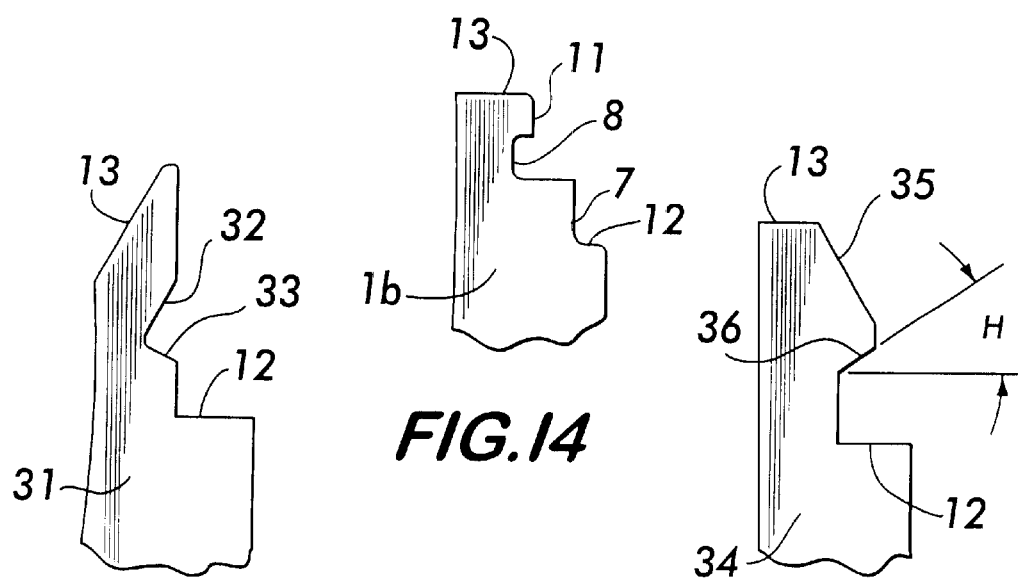
FIGS. 14–16 are top views of alternate extension arm attachment means.

FIG. 14 shows greater detail of the clinch feature at the tip of the side extensions 1b of the fastener. The individual numbered elements correspond to those described with regard to FIG. 7.

FIG. 15 shows an option to the clinch feature that allows the end of the side extensions of the fastener 31 to be folded over, thus permanently attaching it to a sheet. This configuration is optimal for attaching to very a hard sheet and any sheet sized correctly with the appropriate hole.

FIG. 16 depicts an optional method of attachment to the first sheet 2 that allows the ends of the fastener side extensions 34 to be snapped into the mounting hole. This method also allows affixation for any sheet hardness, given the correct thickness of the sheet and the correct hole configuration. With this method the fastener may be removed from the first sheet 2 in case of damage. The back angle 36 can be varied to increase or decrease the force required for removal.

Figure 17:
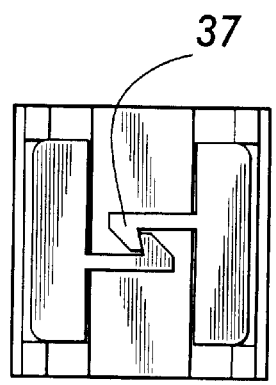
FIG. 17 is a rear view of the lock clip element shown in isolation.
Figure 19:
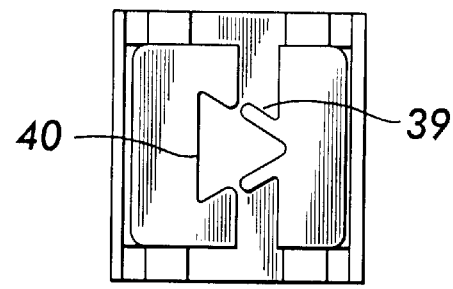
FIG. 19 is a rear view of an alternate embodiment of the lock clip of the present invention shown in isolation.
Figure 18:
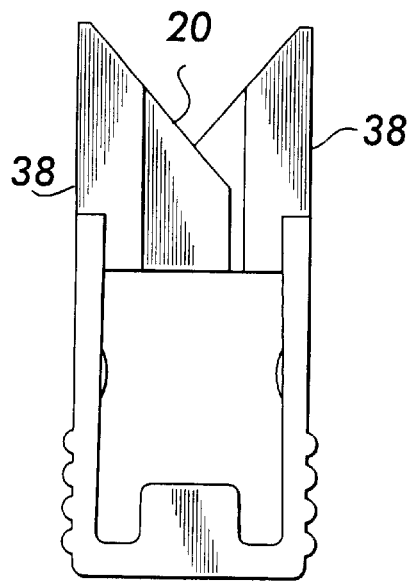
FIG. 18 is a side view of the lock clip shown in FIG. 17.
Figure 20:
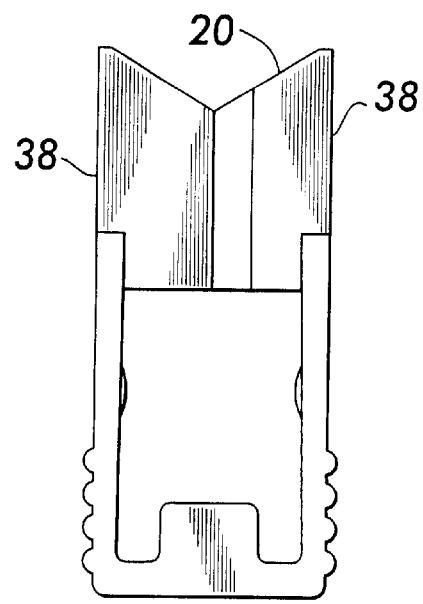
FIG. 20 is a side view of the lock clip shown in FIG. 19.
Figure 21:
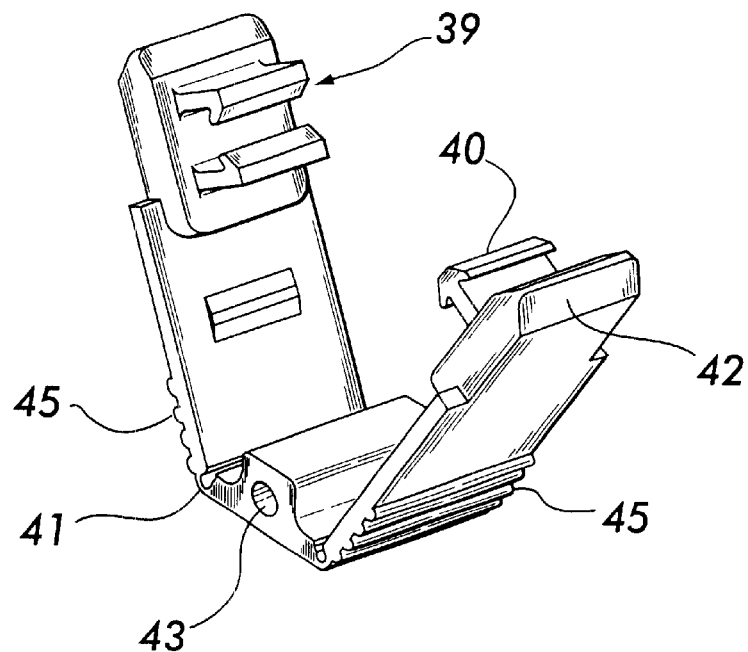
FIG. 21 is a top right rear isometric view of an alternate embodiment lock clip shown in isolation.

FIGS. 17–21 show alternate embodiments of the lock clip. FIGS. 17 and 18 show an optional catch 37 on the lock. The catch ensures that the arms of the lock do not separate and add stability and strength to the lock clip. The catch includes leading taper 20 that allows the lock to be easily assembled to the fastener body. FIGS. 19 and 20 show an optional catch 39 and slot 40 combination that functions similarly to the corresponding features shown in FIGS. 17 and 18. The preferred material for the lock clip is a molded thermoplastic such as acetyl FIG. 21 shows a configuration of the lock clip that utilizes a "living hinge" molded from plastic. During assembly with the fastener body, the lock clip is folded along the hinges 41. The jaws 39 snap over the barb 40. Taper 42 on the outside of the lock is independent of the hinge configuration, and is preferred for all configurations of the lock clip. This taper guides the lock clip along the sides of the rectangular hole 5 in second sheet 3 as it slides forward from the unlocked to the locked position. The hole 43 aids in molding the lock clip as it helps to reduce the sink, or plastic shrinkage, in the thick section of the base.

Figure 22:
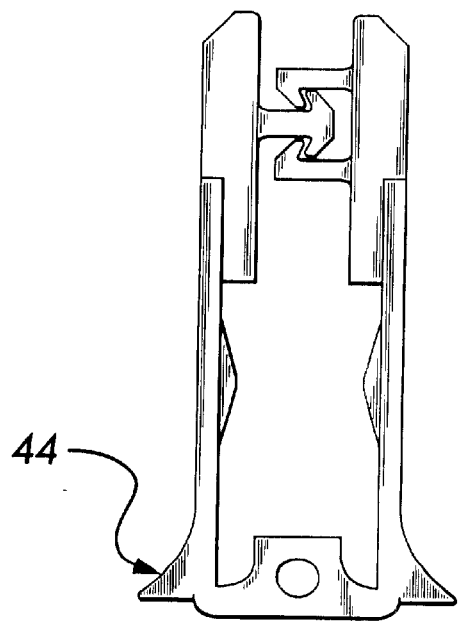
FIG. 22 is a side view of the alternate lock clip shown in FIG. 21.

FIG. 22 shows the lock clip configuration shown in FIG. 21 with the living hinge closed. Also shown in this figure are flaired projections 44 which provide a gripping surface that is oriented so that gripping force does not tighten the lock clip on the fastener base during the unlocking process.

It should be understood that there may be other modifications and changes to the present invention that will be obvious to those of skill in the art. From the foregoing description, however, the present invention should be limited only by the following claims and their legal equivalents.

What is claimed is:

1. A clinch-type fastener used for releasably securing two apertured sheets, face-to-face, comprising:

a main body of said fastener being of a rectangular cross-section;

two side-extensions unitary with said fastener main body and being located on opposite sides thereof, each side-extension including fastening means at an end thereof for attachment of said fastener to a first of said two apertured sheets, said side-extensions being longitudinally extending and parallel to an axis of said main body and further described as being located on opposite sides of said axis;

two laterally resilient snap-arms longitudinally projecting from said main body, said snap-arms being located between said side-extensions, each snap-arm including a barbed end for engaging a second of two apertured sheets; and a lock clip, said lock clip including two longitudinally extending legs movable between an unlocked and a locked position, said legs including tabs thereof projecting inwardly between and abutting inside surfaces of said snap-arms when said legs are in said locked position thereby preventing the inward deflection of said snap-arms.

2. The fastener of claim 1, wherein said attachment means at the end of said side extensions is clinch means including a displacer and an undercut for receiving the cold-flow of metal from said first sheet by press fit.

3. The fastener of claim 1, wherein said attachment means of said side-extensions are structures which provide resilient snap-attachment to the first sheet.

4. The fastener of claim 1, wherein said lock clip includes catch means which extend from said tab portions for holding together the ends of the legs of said lock clip.

5. The fastener of claim 4, wherein said catch means includes inward-facing interlocking jaws.

6. The fastener of claim 1, wherein the outside surface of said lock clip includes ergonomic finger grip ridges.

7. The fastener of claim 1 wherein said lock clip includes a flaired projection at the base of each leg to provide a finger grip.

8. The fastener of claim 1 wherein said lock clip is longitudinally slidable and includes detent means for captivating the lock clip onto the main body of the fastener.

9. The fastener of claim 1 wherein said main body includes a recess which receives the base of said lock clip when in said locked position so that the outer surface of said lock clip base is flush with the end surface of said fastener main body.

10. An assembly including the fastener of claim 1 and further including a first sheet having one or more apertures for receiving said attachment means of said side-extensions and a second sheet having an aperture positioned in registration with said first aperture and having inside edges sized to engage the ends of said snap-arms.

11. The assembly of claim 10 further described in that apertures of said first and second sheets are all rectangular.

12. The assembly of claim 11 wherein the rectangular apertures of said first sheet comprise two outer apertures, each for receiving one of said side extensions, and a center aperture for receiving both of said snap-arms.

13. The assembly of claim 12 wherein the width of said snap-arms is a first dimension and the distance between the outer surfaces of the snap-arms is a second dimension and wherein said dimensions are substantially equal to the respective side edge dimensions of the rectangular aperture in said second sheet such that the second sheet is retained laterally, axially and against rotation when said lock clip is in the locked position.

14. The assembly of claim 13 wherein said first and second dimensions are equal.

* * * * *